(12) United States Patent
Fan et al.

(10) Patent No.: US 11,563,391 B2
(45) Date of Patent: Jan. 24, 2023

(54) MOTOR CONTROL METHOD AND DEVICE

(71) Applicant: BEIJING JINGWEI HIRAIN TECHNOLOGIES CO., INC., Beijing (CN)

(72) Inventors: Jingyuan Fan, Beijing (CN); Shuang Liu, Beijing (CN)

(73) Assignee: BEIJING JINGWEI HIRAIN TECHNOLOGIES CO., INC.

( * ) Notice: Subject to any disclaimer, the term of this patent is extended or adjusted under 35 U.S.C. 154(b) by 0 days.

(21) Appl. No.: 17/295,097

(22) PCT Filed: Aug. 30, 2019

(86) PCT No.: PCT/CN2019/103641
§ 371 (c)(1),
(2) Date: May 19, 2021

(87) PCT Pub. No.: WO2020/155621
PCT Pub. Date: Aug. 6, 2020

(65) Prior Publication Data
US 2022/0021316 A1 Jan. 20, 2022

(30) Foreign Application Priority Data
Jan. 28, 2019 (CN) .......................... 201910079629.2

(51) Int. Cl.
*H02P 5/50* (2016.01)
(52) U.S. Cl.
CPC ..................................... *H02P 5/50* (2013.01)
(58) Field of Classification Search
CPC ............................. H02P 5/50; B60L 2220/42
See application file for complete search history.

(56) References Cited

U.S. PATENT DOCUMENTS

| 5,239,247 A * | 8/1993 | Habig ...................... H02P 5/50 |
| | | 318/67 |
| 2004/0257010 A1 | 12/2004 | Yamamoto |
| 2017/0047882 A1* | 2/2017 | Bian ...................... H02P 29/60 |

FOREIGN PATENT DOCUMENTS

| CN | 202280346 | 6/2012 |
| CN | 103953245 | 7/2014 |

(Continued)

OTHER PUBLICATIONS

European Search Report 19913897.5 dated Oct. 6, 2022.

*Primary Examiner* — Muhammad S Islam
*Assistant Examiner* — Devon A Joseph
(74) *Attorney, Agent, or Firm* — The Belles Group, P.C.

(57) ABSTRACT

Provided are a motor control method and a device, applicable in the technical field of motor control, and particularly applicable to a controller in a motor control system. The system comprises one controller and at least two motors, and each of the motors drives one drive entity. The method comprises: acquiring a control instruction at a current time, a positional relationship of drive entities, and a system state after a previous program cycle has ended; on the basis of the acquired information, and in combination with a pre-established mapping of transition relationships and transition conditions between all system states, determining, from the control instruction at the current time, a target system state corresponding to the system state after the previous program cycle has ended, determining, according to the target system state, a target control instruction, and controlling actions of all of the motors.

10 Claims, 7 Drawing Sheets

(56) References Cited

FOREIGN PATENT DOCUMENTS

| | | | |
|---|---|---|---|
| CN | 103953245 A | * | 7/2014 |
| CN | 105730389 | | 7/2016 |
| CN | 106627064 | | 5/2017 |
| CN | 206983690 | | 2/2018 |
| CN | 206983690 U | | 2/2018 |
| CN | 108032718 A | | 5/2018 |
| CN | 207884519 | | 9/2018 |
| CN | 105730389 B | | 11/2018 |
| CN | 109889106 | | 6/2019 |

* cited by examiner

MOTOR CONTROL METHOD AND DEVICE

The present application is a U.S. national stage application under 35 U.S.C. § 371 of PCT Application No. PCT/CN2019/103641, filed Aug. 30, 2019, which claims the priority of Chinese Patent Application No. 201910079629.2, titled "MOTOR CONTROL METHOD AND DEVICE", filed on Jan. 28, 2019 with the Chinese Patent Office. The disclosures of the aforementioned priority applications are incorporated herein by reference in its entirety.

FIELD

The present disclosure relates to the technical field of motor control, and in particular to a motor control method and a motor control apparatus.

BACKGROUND

In the conventional motor control method, a controller controls a motor to operate based on a preset control logic. For example, in a car electric sunroof control system, two controllers are arranged in the system for controlling a sunshade curtain and a glass in a sunroof to move. The two controllers respectively send a control command to the sunshade curtain and the glass in the sunroof to control the sunshade curtain and the glass in the sunroof to move.

However, according to the conventional motor control method, one controller generally corresponds to one motor. In a case of controlling multiple motors, it is required to provide the same number of controllers as the motors and design an independent control logic for each of the controllers, resulting in a high hardware cost and a high software development cost of the control system.

SUMMARY

In view of this, a motor control method and a motor control apparatus are provided according to the present disclosure to control multiple motors by one controller, reducing the hardware cost and the software development cost of the control system. The specific solutions are as follows.

In a first aspect, a motor control method is provided according to the present disclosure. The method is applied to a controller in a motor control system. The motor control system includes one controller and at least two motors, and each of the motors drives a to-be-driven entity. The method includes: acquiring current control commands, a positional relationship of to-be-driven entities, and a system state at an end of a previous processing period, where the system state at the end of the previous processing period indicates motion states of the motors at the end of the previous processing period; determining a target system state corresponding to the system state at the end of the previous processing period based on a preset mapping relationship, the positional relationship of the to-be-driven entities and the current control commands, where the preset mapping relationship indicates transition relationships between system states and transition conditions for the system states; determining target control commands based on the target system state; and controlling the motors to operate based on the target control commands.

In an embodiment, the motor control method according to the first aspect of the present disclosure further includes: calling a preset master control model; acquiring a value to be assigned to a preset input parameter of the master control model; assigning the value to the preset input parameter to control the master control model to output function control commands respectively corresponding to the motors; and obtaining a total control command based on the function control commands and the target control commands to control each of the motors to operate based on the total control command.

In an embodiment, the master control model includes reference models, the reference models correspond to the motors one-to-one, the preset input parameter is a set including input parameters of all the reference models, all the reference models are associated with a sub-control model, the master control model calls the sub-control model to output the function control commands based on the preset input parameter with the assigned value, and the sub-control model includes sub-function models required for obtaining the function control commands.

In an embodiment, the sub-control model is arranged with multiple association interfaces for calling the sub-function models, and the association interfaces correspond to the sub-function models one-to-one.

In an embodiment, before controlling the motors to operate based on the target control commands, the motor control method according to the first aspect of the present disclosure further includes: calling a target function model to filter the target control commands to control the motors to operate based on the filtered target control commands, where the target function model performs part of functions to be performed by the motors.

In a second aspect, a motor control apparatus is provided according to the present disclosure. The apparatus is applied to a controller in a motor control system. The motor control system includes one controller and at least two motors, and each of the motors drives a to-be-driven entity. The apparatus includes: a first acquirement, a first determination, a second determination, and a first controller. The first acquirement is configured to acquire current control commands, a positional relationship of to-be-driven entities, and a system state at an end of a previous processing period, where the system state at the end of the previous processing period indicates motion states of the motors at the end of the previous processing period. The first determination is configured to determine a target system state corresponding to the system state at the end of the previous processing period based on a preset mapping relationship, the positional relationship of the to-be-driven entities and the current control commands, where the preset mapping relationship indicates transition relationships between system states and transition conditions for the system states. The second determination is configured to determine target control commands based on the target system state. The first controller is configured to control the motors to operate based on the target control commands.

In an embodiment, the motor control apparatus according to the second aspect of the present disclosure further includes: a first caller, a second acquirement, an assignment, and a second controller. The first caller is configured to call a preset master control model. The second acquirement is configured to acquire a value to be assigned to a preset input parameter of the master control model. The assignment is configured to assign the value to the preset input parameter to control the master control model to output function control commands respectively corresponding to the motors. The second controller is configured to obtain a total control command based on the function control commands and the target control commands to control each of the motors to operate based on the total control command.

In an embodiment, the master control model includes reference models, the reference models correspond to the motors one-to-one, the preset input parameter is a set including input parameters of all the reference models, all the reference models are associated with a sub-control model, the master control model calls the sub-control model to output the function control commands based on the preset input parameter with the assigned value, and the sub-control model includes sub-function models required for obtaining the function control commands.

In an embodiment, the sub-control model is arranged with multiple association interfaces for calling the sub-function models, and the association interfaces correspond to the sub-function models one-to-one.

In an embodiment, the motor control apparatus according to the second aspect of the present disclosure further includes a second caller. The second calling unit is configured to call a target function model to filter the target control commands to control the motors to operate based on the filtered target control commands, where the target function model performs part of functions to be performed by the motors.

In the third aspect, a motor control device is provided according to the present disclosure. The device includes: a memory and a processor. The memory stores a program executable for the processor. The program, when executed by the processor, causes the processor to perform the motor control method according to the first aspect of the present disclosure.

In a fourth aspect, a storage medium storing a program is provided according to the present disclosure. The program, when executed by a processor, causes the processor to perform the motor control method according to the first aspect of the present disclosure.

In a fifth aspect, a computer program product is provided according to the present disclosure. The computer program product includes a computer program stored on a non-transitory computer-readable storage medium. The computer program includes program instructs. The program instructs, when executed by a computer, cause the computer to perform the motor control method according to the first aspect of the present disclosure.

Based on the above technical solutions, a motor control method and a motor control apparatus are provided according to the present disclosure. The method is applied to a controller in a motor control system. The motor control system includes one controller and at least two motors, and each of the motors drives a to-be-driven entity. In the method, current control commands, a positional relationship of to-be-driven entities, and a system state at an end of a previous processing period are acquired first, where the system state at the end of the previous processing period indicates motion states of the motors at the end of the previous processing period; a target system state corresponding to the system state at the end of the previous processing period is determined based on the above acquired information, a preset mapping relationship indicating transition relationships between system states and transition conditions for the system states, and the current control commands; then target control commands are determined based on the target system state; and then the motors are controlled to operate based on the target control commands. According to the motor control method and the motor control apparatus in the present disclosure, one controller corresponds to multiple motors, the system state indicates motion states of all the motors, and the preset mapping relationship indicating the transition relationships between system states and transition conditions for the system states is pre-determined, thereby controlling all the motors by the controller. Compared to the conventional technology, according to the motor control method and the motor control apparatus in the present disclosure, in hardware, all the motors are controlled by one controller, thereby reducing the number of controllers; and in software, the system state indicates motion states of all the motors, and the preset mapping relationship indicates the transition relationships between system states and transition conditions for the system states, thereby avoiding designing an independent control program for each of the motors. Therefore, with the motor control method and the motor control apparatus according to the present disclosure, the hardware cost and the software development cost of the control system can be reduced.

BRIEF DESCRIPTION OF THE DRAWINGS

For more clearly illustrating the technical solutions according to the embodiments of the present disclosure or the conventional technology, the drawings to be used in the description of the embodiments or the conventional technology are briefly described hereinafter. Apparently, the drawings described below illustrate only some embodiments of the present disclosure. Other drawings may be obtained by those skilled in the art according to these drawings without any creative effort.

DETAILED DESCRIPTION OF THE EMBODIMENTS

In order to make the objectives, technical solutions and advantages of the embodiments of the present disclosure clearer, technical solutions according to the embodiments of the present disclosure are described clearly and completely hereinafter in conjunction with the drawings used in the embodiments of the present disclosure. It is apparent that the described embodiments are only some embodiments of the present disclosure rather than all the embodiments. Based on the embodiments of the present disclosure, all other embodiments acquired by those skilled in the art without any creative effort fall within the protection scope of the present disclosure.

A motor control method is provided according to an embodiment of the present disclosure. The method is applied to a controller in a motor control system. The motor control system includes one controller and at least two motors, and each of the motors corresponds to a to-be-driven entity. The motor control system may be regulated according to different application scenarios. For example, in a car sunroof control system or a car window control system, the motors are driving motors arranged in the car sunroof control system or the car window control system, and the to-be-driven entity corresponding to each of the motors is the glass in the sunroof/window or the sunshade curtain. Apparently, the motor control system further includes other mechanisms required for performing control functions, such as a control switch for issuing an operation command.

Figure 1:
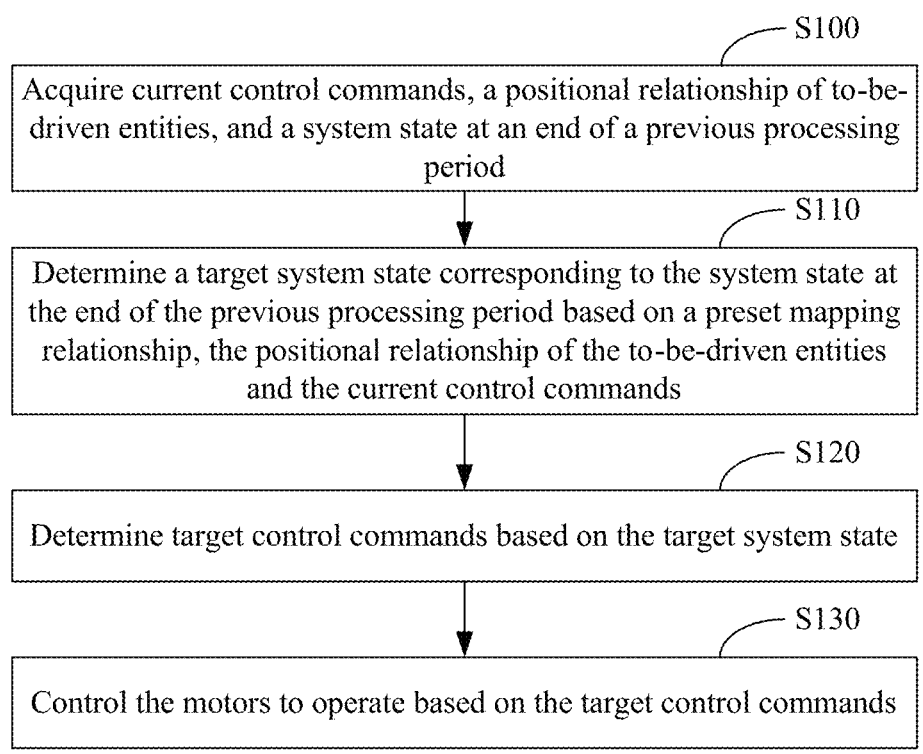
FIG. 1 is a flowchart of a motor control method according to an embodiment of the present disclosure.

Reference is made to FIG. 1, which is a flowchart of a motor control method according to an embodiment of the present disclosure. As shown in FIG. 1, the method may include the following steps S100 to S130.

In step S100, current control commands, a positional relationship of to-be-driven entities and a system state at an end of a previous processing period are acquired.

Figure 2:
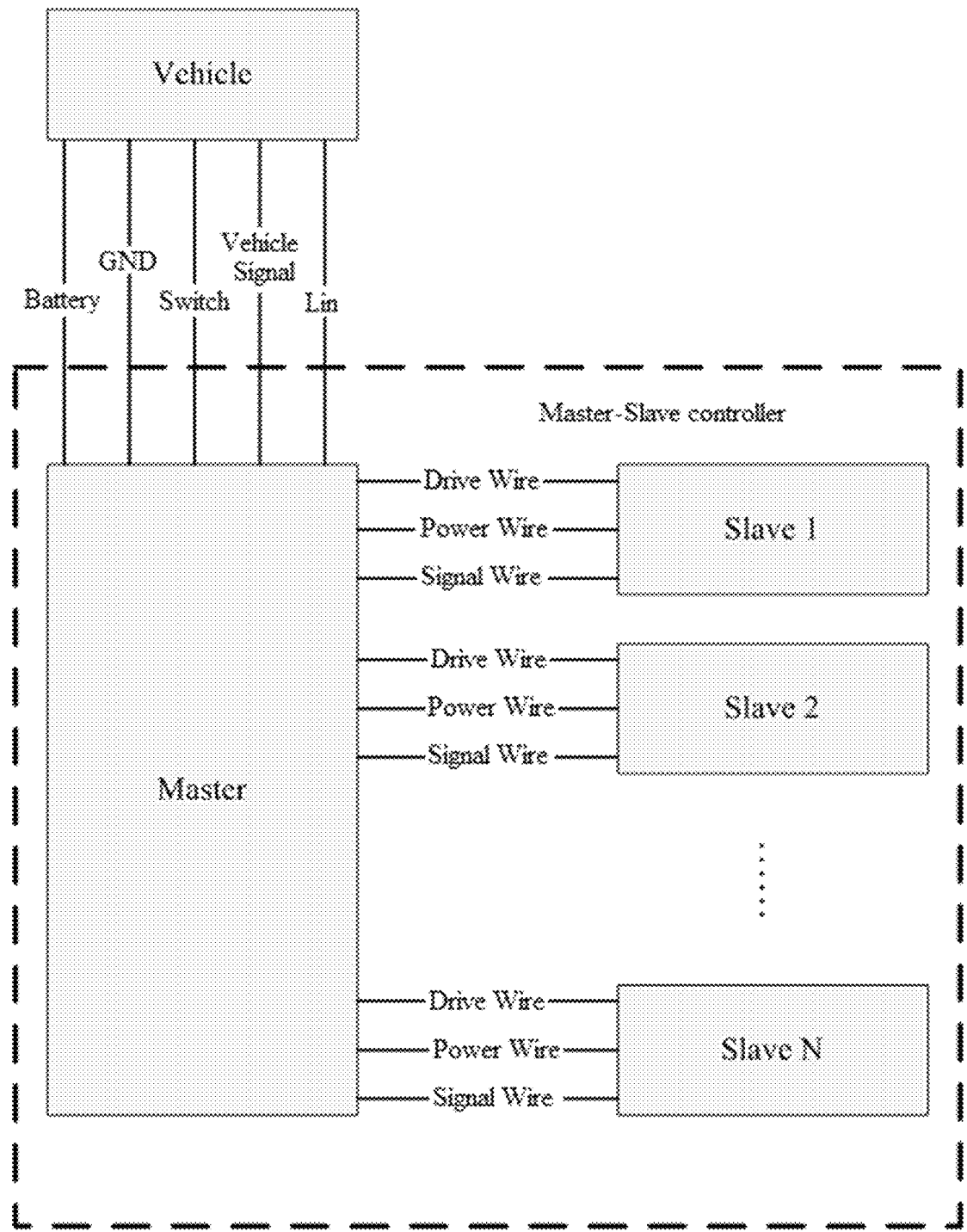
FIG. 2 is a block diagram of a motor control system in a vehicle application scenario according to an embodiment of the present disclosure.

In an embodiment, for implementing the motor control method according to the embodiment of the present disclosure, it is required to improve the hardware control circuit of the motor control system. A motor control system in a vehicle application scenario is taken as an example to describe the motor control method in the embodiment of the present disclosure. Reference is made to FIG. 2, which is a block diagram of a motor control system in a vehicle application scenario according to an embodiment of the present disclosure. As show in the block diagram, there is only one controller, and the controller is connected to multiple motors. For ease of illustration, in the embodiment of the present disclosure, the hardware connection mode shown in FIG. 2 is called as a Master-Slave mode.

Specifically, in a case that the controller is directly arranged together with any one of the multiple motors, the motor directly connected to the controller and the controller serve as the Master, the motor directly connected to the controller is called as a Master motor, and each of the other motors is connected to the controller via a wire harness and is called as a Slave motor. The connection mode in this case is called as an integrated connection mode.

In a case that the controller is arranged independently and is not directly connected to any motor, the controller serves as the Master, and each of the motors is connected to the controller via a wire harness and serves as a Slave motor. The configuration in this case is called as a master connection mode.

In the above two connection modes, one controller is arranged, and multiple motors are arranged. The number of the controller and the motor is determined based on the motor control system. In addition, FIG. 2 exemplarily shows the connection between the controller and other components. Taking the car window control system as an example, FIG. 2 shows the connection between the controller serving as a Master and the vehicle, and the connection between the Master controller and each of the motors (shown as Slave 1 to Slave N in FIG. 2). It should be noted that the connection lines shown in FIG. 2, such as the power line Battery, the ground line GND, the vehicle signal line Vehicle Signal, the local interconnection network bus Lin, the driving wire lines Drive Wire connected to the Slave motors, the power supply line Power Wire and the signal line Signal Wire, are all exemplary, and the connections are determined according to application scenarios. It should be emphasized that in the Figure, only one switch Switch is arranged to connect the controller and the vehicle. In practical applications, multiple switches are to be arranged to connect to the controller for controlling different motors to operate.

Figure 3:
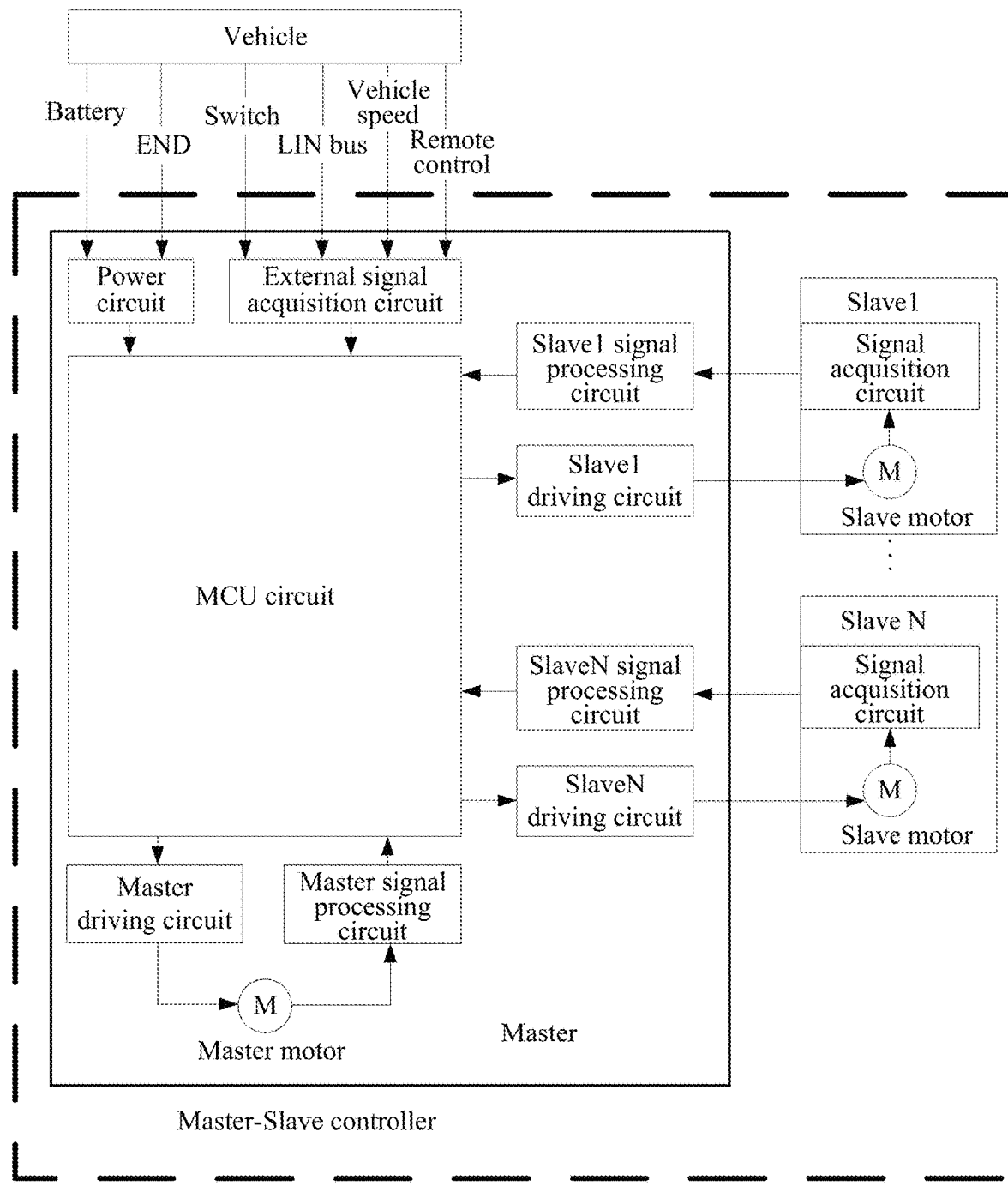
FIG. 3 is a block diagram of a hardware circuit for implementing a motor control method according to an embodiment of the present disclosure.

In an embodiment, reference is made to FIG. 3, which is a block diagram of a hardware circuit for implementing a motor control method according to an embodiment of the present disclosure. Taking the car window control system as an example, FIG. 3 shows connections between components of the motor control system in the integrated connection mode.

Specifically, a hardware circuit includes but is not limited to a power supply circuit, a controller (taking an MCU circuit as an example in FIG. 3), peripheral circuits of the controller, an external signal acquisition circuit, Slave driving circuits, and Slave signal processing circuits. As mentioned above, the motors and circuits connected to the motors are represented by Slave 1 to Slave N. For example, the Slave 1 signal processing circuit represents a signal processing circuit corresponding to motor 1, and so on. Other circuits are not described in detail herein. The Master motor is the motor directly connected to the controller. The connection between the Master motor and the controller is performed by the Master driving circuit and the Master signal processing circuit.

The power circuit is exemplarily connected to the vehicle via the power line Battery and the ground line GND. The power circuit obtains electric energy from outside, such as from a storage battery arranged in the vehicle, and convert the obtained electric energy into an electric energy at a voltage level available to the controller to ensure normal operation of the controller. In addition, the power circuit detects whether the voltage of the supplied power meets a preset usage requirement to prevent the controller from being damaged by an abnormal input voltage. Apparently, the power supply circuit should be capable of performing other necessary functions, which is not described in detail herein.

The controller is configured, after obtaining various signals, to output a drive control command respectively to the Master motor and each of the Slave motors base on preset control logic to control the Master motor and each of the Slave motors to operate.

Between the external signal acquisition circuit and the vehicle, a switch Switch connection line, a local interconnection network bus Lin, a connection line for acquiring vehicle speed information, a connection line for performing remote control and the like are arranged. The external signal acquisition circuit obtains an electric signal from the vehicle. The external signal acquisition circuit may process the electric signal from the vehicle into a signal that can be received by the controller, and transmit the signal to the circuit where the controller is located. It should be noted that any signal acquisition circuit other than the controller is an external signal acquisition circuit.

The Slave driving circuit (FIG. 3 exemplarily shows a driving circuit corresponding to motor Slave 1 and a driving circuit corresponding to motor Slave N) drives a Slave motor to operate. The Slave driving circuit may convert a control signal (that is, a driving control command) outputted by the controller into an electric output with a high power by using a power device, and transmit the electric output to a Slave motor via a wire harness to drive the Slave motor to operate. For each of the Slave motors, an independent Slave driving circuit is arranged in the controller.

The Slave signal processing circuit (FIG. 3 exemplarily shows a signal processing circuit corresponding to motor Slave 1 and a signal processing circuit corresponding to motor Slave N) acquires and processes a feedback signal from a motor. The Slave signal processing circuit may acquire a feedback signal from a Slave motor, process the feedback signal into a signal that can be received by the controller, and transmit the processed signal to the controller for logic control. For each of the Slave motors, an independent Slave signal processing circuit is arranged in the controller.

The driving circuit and the signal processing circuit for the Master motor have the same functions as the driving circuit and the signal processing circuit for the Slave motor, and are not repeated herein.

After the above hardware connections are performed, the controller may, in a processing period, acquire state information of the switch, such as whether the switch is pressed, the time instant when the switch is pressed, and the order in which the switch is pressed. Based on the acquired state information of the switch, the controller determines a control command according to a preset corresponding relationship between switch states and control commands. In addition, a positional relationship of to-be-driven entities may be acquired. The positional relationship may be a front-to-back relationship of the to-be-driven entities indicated by distances of the to-be-driven entities from an origin of a preset coordinate system, or may be indicated by actual distances between the to-be-driven entities and an origin of a preset coordinate system. In the application scenario of the car window control system, the positional relationship of the to-be-driven entities may be indicated by a degree of opening of each of the to-be-driven entities.

Further, the controller needs to acquire a system state at an end of a previous processing period. The system state at the end of the previous processing period includes motion states of the motors at the end of the previous processing period, such as whether each of the motors is in operation and whether the motor is rotating forward or backward. It should be noted that in a processing period, for each of the motors, the motion state may or may not change, and the system state of this processing period only includes the motion states of the motors at the end of the processing period. After entering a new processing period, the system state of the previous processing period is used as an initial system state of the current processing period. Therefore, it is required to acquire the current control commands, the positional relationship of the to-be-driven entities, and the system state at the end of the previous processing period.

In step S110, a target system state corresponding to the system state at the end of the previous processing period is determined based on a preset mapping relationship, the positional relationship of the to-be-driven entities and the current control commands.

In the motor control method according to the embodiment of the present disclosure, a preset mapping relationship is predetermined. The preset mapping relationship indicates transition relationships between system states and transition conditions for the system states. For the same current system state, different system state transitions occur in different transition conditions.

As mentioned above, the system state indicates the motion states of the motors. In an embodiment, a state machine may be constructed to determine a combination of motion states of the motors to obtain multiple system states, that is, states in the state machine. In addition, the state machine may indicate transition relationships between system states and transition conditions for the system states, that is, the state machine may indicate the preset mapping relationship.

In an embodiment, a car sunroof control system (in which a glass in a sunroof and a sunshade curtain are arranged and both the glass in the sunroof and the sunshade curtain are electronic control components) is taken as an example to describe the concept of setting system state in the embodiment of the present disclosure.

In the conventional designs, the sunshade curtain is made of soft materials, thus it is required that the degree of opening of the sunshade curtain is always greater than the degree of opening of the glass in the sunroof to ensure that the sunshade curtain is not affected by wind resistance and other factors. Therefore, it is required to consider a linkage control of the glass in the sunroof and the sunshade curtain in designing the control logic. The linkage control of the glass in the sunroof and the sunshade curtain may include the following two control types.

For type A, the sunshade curtain are opened to a position corresponding to the glass of the sunroof being fully opened (usually at a position in the middle of the roof) before opening the glass in the sunroof, and the glass of the sunroof is completely closed before the sunshade curtain are controlled to be closed.

For type B, it is required to compare the positions of the glass in the sunroof and the sunshade curtain first. Before opening the glass in the sunroof, in a case that the degree of opening of the sunshade curtain is less than a sum of the degree of opening of the glass in the sunroof and a preset margin, the sunshade curtain is first moved to a position corresponding to the sum of the degree of the opening of the glass in the sunroof and the preset margin, then the glass in the sunroof and the sunshade curtain are opened together. The preset margin is a predetermined distance between the glass in the sunroof and the sunshade curtain, and is determined in designing the control logic. In a case that the degree of opening of the sunshade curtain is greater than a sum of the degree of opening of the glass in the sunroof and a preset margin, especially in a case that the degree of opening of the sunshade curtain is greater than a sum of the degree of opening of the glass in the sunroof and a preset margin (this case corresponds to the following situation: the sunroof control system first performs operations in response to a sunshade curtain opening command, the sunshade curtain moves for a distance and then stops, that is, the sunshade curtain is not fully opened, then the sunroof control system receives a sunroof glass full open command and performs operations in response to the command), since the degree of the opening of the glass in the sunroof cannot be greater than the degree of the opening of the sunshade curtain, the glass in the sunroof is first moved to a position corresponding to the sum of the degree of the opening of the sunshade curtain and the preset margin, then the sunshade curtain and the glass in the sunroof are opened together. In closing the sunshade curtain or in linkage closing of the sunshade curtain and the glass in the sunroof, the symmetrical logic is similar. For example, in closing the sunshade curtain, in a case that the degree of opening of the sunshade curtain is less than the sum of the degree of opening of the glass in the sunroof and the preset margin, the glass in the sunroof is first moved to a position corresponding to the sum of the degree of the opening of the sunshade curtain and the preset margin, then the glass in the sunroof and the sunshade curtain are closed together; and in a case that the degree of opening of the sunshade curtain is greater than the sum of the degree of opening of the glass in the sunroof and the preset margin, the sunshade curtain is first moved to a position corresponding to the sum of the degree of the opening of the glass in the sunroof and the preset margin, then the glass in the sunroof and the sunshade curtain are closed together.

It should be noted that in the control logic of type B, it should be ensured that the degree of the opening of the sunshade curtain is always greater than the degree of the opening of the glass in the sunroof. In the opening process or the closing process, if the degree of the opening of the sunshade curtain is less than or equal to the degree of the opening of the glass in the sunroof, the sunshade curtain or the glass in the sunroof is controlled to move for a distance until the degree of the opening of the sunshade curtain is greater than the degree of the opening of the glass in the sunroof.

It should be noted that each of the motors corresponds a to-be-driven entity. In the above description of the system state, in order to facilitate the expression, the system state is determined based on the positional relationships of the to-be-driven entities and the movements of the to-be-driven entities. It should be understood that the system state actually indicates the motion states of the motors based on the positional relationship of the to-be-driven entities.

Based on the above description, in the application scenario of a car sunroof/window control system according to the embodiments of the present disclosure, multiple system states may be obtained based on the motion states of the motors.

Figure 4:
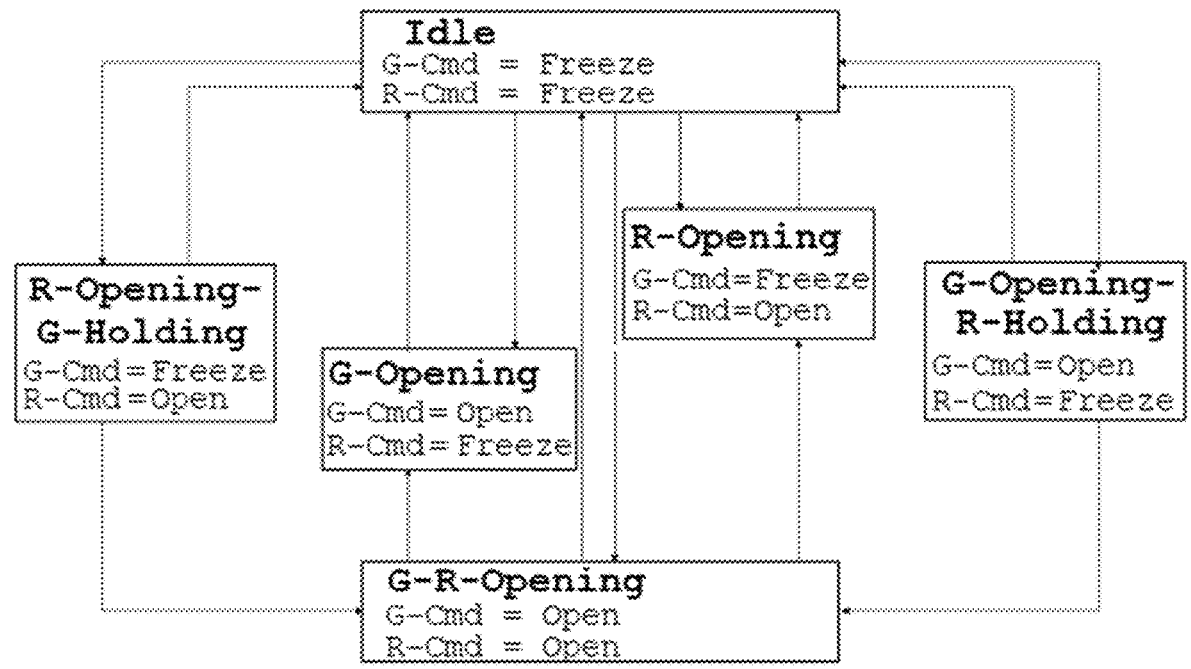
FIG. 4 is a schematic diagram showing transitions between system states in a motor control method in an application scenario according to an embodiment of the present disclosure.

Reference is made to FIG. 4, which is a schematic diagram showing transitions between system states in a motor control method in an application scenario according to an embodiment of the present disclosure. As shown in FIG. 4, taking the opening of the glass in the sunroof and/or the sunshade curtain according to the control logic of type B as an example, multiple system states, transition relationships (including but not limited to the transition relationships shown in FIG. 4) between the system states, and transition conditions (including but not limited to the transition conditions shown in FIG. 4) for the system states may be determined. In FIG. 4, G-Cmd represents a control command for the glass in the sunroof, R-Cmd represents a control command for the sunshade curtain, Freeze indicates that a control command is invalid or empty, and Open indicates that a control command is valid.

Idle state (a stationary state, in which the glass in the sunroof and the sunshade curtain are both stationary);

G-Opening state (in which the glass in the sunroof is opened);

R-Opening state (in which the sunshade curtain is opened and the glass in the sunroof is not waiting for the movement of the sunshade curtain);

G-R-Opening state (in which both the glass in the sunroof and the sunshade curtain are opened, and type A does not include this state);

R-Opening-G-Holding stare (in which the sunshade curtain is opened and the glass in the sunroof is waiting for the sunshade curtain to move to a certain position); and G-Opening-R-Holding state (in which the glass in the sunroof is opened and the sunshade curtain is waiting for the glass in the sunroof to move to a certain position, and type A does not include this state).

Further, a target system state corresponding to the system state at the end of the previous processing period is determined based on the preset mapping relationship as shown in the schematic diagram of transitions between system states in FIG. 4, the positional relationship of the to-be-driven entities, and the current control commands. As mentioned above, the system state at the end of the previous processing period may be obtained directly, and the positional relationship of the to-be-driven entities may be obtained at the beginning of the current processing period. Based on the transition relationships shown in FIG. 4 and the current control commands, the target system state corresponding to the system state at the end of the previous processing period may be determined.

Specifically, each of the arrows in FIG. 4 indicates a stare transition, and is triggered on meeting a condition. For example, in a case that the system state at the end of the previous processing period is determined as Idle state based on foregoing steps and a sunshade curtain open command is received in the current processing period, the target system state is determined as R-Opening state according to the transition relationships between system states included in the preset mapping relationship shown in FIG. 4. For another example, in a case that the current control command is a glass open command, the degree of the opening of the sunshade curtain is determined greater than or equal to the sum of the degree of opening of the glass in the sunroof and the preset margin based on the positional relationship of the glass of the sunroof and the sunshade curtain, and the degree of the opening of the sunshade curtain is less than the sum of the degree of opening of the glass in the sunroof and the preset margin at the end of the previous processing period, that is, the system state at the end of the previous processing period is R-Opening-G-Holding state, the target system state is determined as G-R-Opening state according to the preset mapping relationship.

It can be seen from the above examples that the preset mapping relationship is determined based on the above two control types (type A and type B), and meets the condition that the degree of the opening of the sunshade curtain is always greater than the degree of the opening of the glass in the sunroof.

For type A, the architecture of the preset mapping relationship in type A is similar to the architecture of the preset mapping relationship in Type B. In type A, G-Opening-R-Holding state and G-R-Opening state are not included, and there is a transition relationship between R-Opening-G-Holding state and G-Opening state. Specifically, if the system in R-Opening-G-Holding state meets a transition condition of "the sunshade curtain has reached the position of the middle of the roof", the target system state is determined as G-Opening state. Other state transitions in type A and type B are the same, which are not repeated herein.

According to the actual situation, faults of a multi-motor control system often appear at a time instant of a state transition. Compared with the control method according to the conventional technology, in the method according to the present disclosure, there is only one system state transition (or no system state transition, that is, the current system state is the same as the target system state) in a processing period, the parameters based on which the current system state is determined and the parameters based on which the target system state is determined are acquired in the same processing period, the targets (such as the glass in the sunroof and the sunshade curtain) to be controlled are independent, the controlling of any target does not depend on an execution result in a previous processing period, and the motion state and position information of any target may affect the system stare in the current processing period without hysteresis. Therefore, it is easier to debug and analyze the method according to the present disclosure.

In step S120, target control commands are determined based on the target system state.

Based on the above description, it should be understood that the system state is determined based on the motion states of the motors. Therefore, after a target system state is determined, target motion states of the motors indicated by the target system state are determined, that is, the motors to perform operations and the motors not to perform operations are determined, and for each of the motors to perform operations, a direction of rotation of the motor and a to-be-driven entity corresponding to the motor are determined. Thus, for each of the motors, a target control command is obtained.

In step S130, the motors are controlled to operate based on the target control commands.

After the target control commands are obtained, the motors are controlled to operate. It should be understood that the target control commands may include a null command, and the motor that receives the null command does not perform any operation.

According to the motor control method in the embodiments of the present disclosure, one controller corresponds to multiple motors, the system state indicates motion states of all the motors, and the preset mapping relationship indicating the transition relationships between system states and transition conditions for the system states is pre-determined, thereby controlling all the motors by the controller. Compared to the conventional technology, according to the motor control method in the present disclosure, in hardware, all the motors are controlled by one controller, thereby reducing the number of controllers; and in software, the system state indicates motion states of all the motors, and the preset mapping relationship indicates the transition relationships between system states and transition conditions for the system states, thereby avoiding designing an independent control program for each of the motors. Therefore, with the motor control method according to the present disclosure, the hardware cost and the software development cost of the control system can be reduced.

It should be noted that the above steps are performed in a same processing period. That is, multiple processing periods are required to perform the process of controlling a to-be-driven entity to move to a certain position, such as controlling the glass in the window from closed to fully opened. The above steps are cyclically performed to achieve the expected control.

It should be further noted that before new control commands are received, it is required to limit the timeliness of the current control commands to ensure that the current control commands can be effectively executed. The limitation may be performed based on the method according to the conventional technology, which is not limited in the present disclosure.

People participate in most application scenarios of the motor control system. To ensure the safety of the participants and the safety of the devices in the motor control system, the motor control system is often provided with a control function having a high priority, such as a function of controlling a motor to stop operating urgently and a function of controlling a motor to decelerate.

Specifically, in a car sunroof control system, a sunroof anti-pinch function and a motor thermal protection function are control functions having a high priority. Taking the sunroof anti-pinch function as an example, while the glass in the sunroof and/or the sunshade curtain are operating in response to a closing command, the sunroof anti-pinch function is performed in a case that an obstacle, such as a human hand, is detected according to a preset control logic or other preset trigger condition is met, to prevent the glass in the sunroof and/or the sunshade curtain from damaging the obstacle, and the closing command being executed is not to be executed.

For performing the above functions, independent control logic is designed for each of the motors according to the conventional technology, that is, each of the motors is provided with a control model. Then, in a case that a controller controls multiple motors to operate, control models respectively corresponding to all the motors are required to be loaded in the controller, complicating the control algorithm in the controller, and occupying a lot of storage space and other resources of the controller by a large amount of code. In order to ensure the control functions can be performed normally, the requirements on the performance of the controller are increased, and the design cost is to be increased, which is apparently undesirable for those skilled in the art. In addition, some sub-functions in the control model may be upgraded and modified due to faults. Since the codes of the entire control model are edited as a whole, the improvement of some functions causes the entire control model to be modified accordingly, affecting the upgrade, maintenance and platformization of the control model and resulting in a huge workload.

It is found that, although the control functions having a high priority, such as the sunroof anti-pinch function and the motor thermal protection function, are respectively applied to independent motors, control logics for control models are the same, and control functions performed by the motors are the same, and it is only required to configure different parameters (that is, the control objects are different). Based on this, a motor control method is provided according to another embodiment of the present disclosure.

Based on the above embodiments, a preset master control model is called with a preset period, a value to be assigned to a preset input parameter of the master control model is acquired, the acquired value is assigned to the preset input parameter to control the master control model to output function control commands respectively corresponding to the motors, a total control command is obtained based on the function control commands and the target control commands to control each of the motors to operate based on the total control command.

In an embodiment, in obtaining the total control command based on the function control commands and the target control commands, a priority may be preset for each of the commands, and a command having a higher priority may be selected as the total control command.

It should be noted that the control functions performed by the master control model usually have high priorities, the preset period with which the master control model is called may be longer than the period with which the control method according to the above embodiments is performed, as long as it is ensured the master control model is called regularly to perform the control functions. Moreover, the master control model according to the embodiment of the present disclosure is a control model corresponding to the control function of each of the motors in the control system, that is, each of the motors is to call the master control model to perform the control function.

Figure 5:
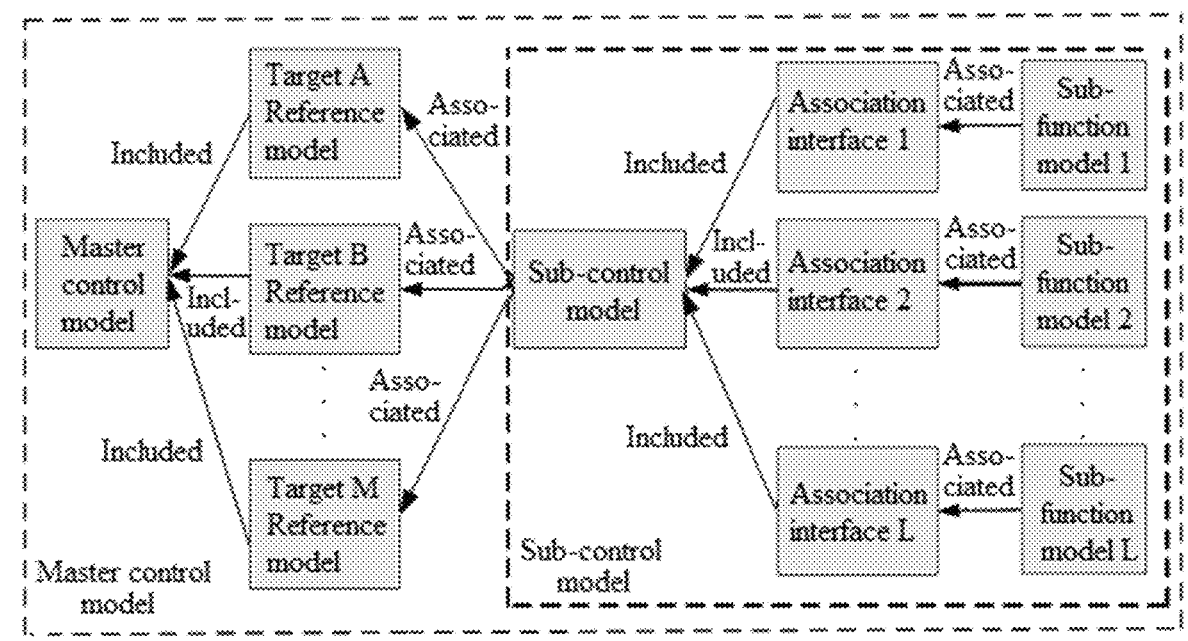
FIG. 5 is a schematic diagram showing an architecture of a master control model in a motor control method according to an embodiment of the present disclosure.

In an embodiment, reference is made to FIG. 5, which is a schematic diagram showing an architecture of a master control model in a motor control method according to an embodiment of the present disclosure. FIG. 5 shows an overall architecture of a master control model. It can be seen that the master control model includes multiple reference models, and the reference models correspond to the motors one-to-one. In the embodiment of the present disclosure, a sub-control model is provided. Each of the reference models is associated with the sub-control model by calling. The sub-control model includes multiple association interfaces, and the association interfaces correspond to the sub-function models one-to-one by calling, and the sub-function modules perform function control commands. Based on the architecture, after the master control model is called, all the reference models in the master control model are to be traversed, and each of the reference models is to call a sub-control model. The preset input parameter of the master control model is a set including input parameters of all the reference models. Assigning a value to the preset input parameter of the master control model indicates assigning a value to an input parameter of a sub-control model called by each of the reference models. The sub-control model calls a sub-function model to obtain a function control command corresponding to the sub-function model. In FIG. 5, target A, target B, . . . , target M, association interface 1, association interface 2, . . . , association interface L, and sub-function model 1, sub-function model 2, . . . , sub-function model L are all exemplary. In practical applications, the number and identifier of the target, the number and identifier of the association interface, and the number and identifier of the sub-function model are determined according to actual requirements.

Before constructing the master control model, the designer clearly know the control functions to be performed by the master control model. In constructing the master control model, it is required to construct the sub-function modules first based on the control functions to be performed by the master controller model. Taking the window anti-pinch function of the car window control system as an example, in order to perform the window anti-pinch function, at least the following sub-function models are required, including an anti-pinch region determination sub-function model, a position extraction sub-function model, a voltage fluctuation detection sub-function model, a learning and initialization sub-function model, a threshold selection sub-function model, and an anti-pinch force calculation sub-function model. Each of the sub-function models may be understood as a basic function unit in the system. A function corresponding to a sub-function model is performed by executing program code corresponding to the sub-function model.

After the required sub-function models are constructed, it is required to construct a sub-control model. The sub-control model may be understood as a control model for a single control target (that is, a motor). Different from the conventional technology, according to the method in the present disclosure, it is unnecessary to construct a sub-control model for each of control targets, and common control functions of all the control targets are integrated in the sub-control model. Each of the control targets may call the sub-control model, that is, the sub-control model is shared by the control targets. The sub-control model includes multiple association interfaces, and the association interfaces correspond to the sub-function models one-to-one.

It should be noted that the number of the association interface actually configured may be more than the number of the sub-function model actually associated. In the subsequent process of upgrading program or adding a new sub-function model, a calling relationship between an association interface and the new sub-function model is directly established without configuring a new association interface. Based on the association interfaces, each of the sub-function models and the sub-control model have a calling relationship, and the sub-control model does not contain the codes corresponding to each of the sub-function models. Thus, in a case of updating a sub-function model or regulating codes corresponding to a sub-function model, it is only required to release the calling relationship between the sub-control model and the sub-function model using the association interface without changing other sub-function models, facilitating the upgrade and regulation of the sub-function model.

Apparently, the association interface may not be arranged. The sub-control model may directly calls a sub-function model to perform the function of the sub-function model.

After obtaining the sub-control model, the master control model may be constructed. The master control model may be understood as a set of multiple reference models. According to the number of the motors, a corresponding number of reference models are constructed in the master control model, and each of the reference models is associated with the same sub-control model. Thus, the master control model is constructed.

It should be understood that the relationships between the reference models in the master control model and the sub-control model are similar to the relationships between the sub-control model and the sub-function models, which are not be repeated herein.

Figure 6:
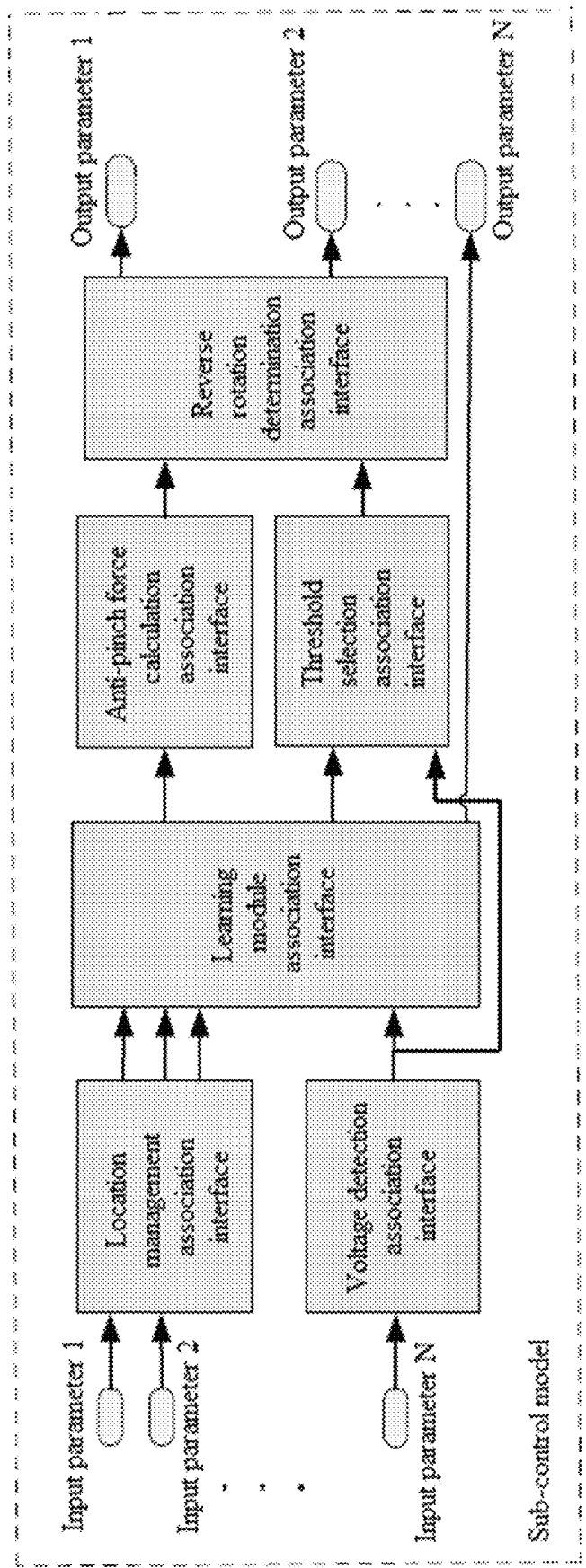
FIG. 6 is a schematic diagram showing an architecture of a sub-control model in a motor control method according to an embodiment of the present disclosure.

In an embodiment, reference is made to FIG. 6, which is a schematic diagram (taking a window anti-pinch control function as an example) showing an architecture of a sub-control model in a motor control method according to an embodiment of the present disclosure. In the sub-control model, N input parameters and N output parameters are configured. The N input parameters are parameters required to be received for performing control functions. The N output parameters are used for a connection (in program, the output parameters may be used as input parameters of another control model to realize a calling relationship between models) with an external model such as a motor driving model. Thus, the output parameters of the sub-control model may be understood as functional control commands. Specifically, the output parameters of the sub-control model may be executable commands to be directly outputted to a driving circuit. Apparently, the output parameters of the sub-control model may be intermediate parameters to be inputted to another control model to call or trigger the control model.

As shown in FIG. 6, the preset input parameters required for constructing the sub-control model are determined based on the sub-function models, the input parameters of the sub-control model include the input parameters of all the sub-function models. There are preset parameter calling relationships between the sub-function models. The calling relationships are predetermined by the designer at the beginning of the design. One may refer to the conventional technology for the calling relationships, which are not repeated herein. Each of the sub-function models has an output parameter. The output parameters of some sub-function models are only called in the sub-control model, and the output parameters of some sub-function models are eventually to be outputted.

It should be noted that in the sub-control model shown in FIG. 6, the preset calling relationships (which may be understood as information transmission relationships) between association interfaces are actually calling relationships between the sub-function models associated with the association interfaces. In fact, the association interfaces have no direct calling relationships and are independent of each other. The association interfaces are used by the sub-control model to call the sub-function models. FIG. 6 shows the calling relationships between the association interfaces to show the calling relationships between the sub-function models.

In an embodiment, for different motors, the input parameter and output parameter may be different. An array may be used to identify the parameters of different motors in constructing the model. The dimension of the array is the same as the number of the motors, as shown in the following equation:

$$Parameter[N]=\{ParameterA, ParameterC, \ldots, ParameterN\}$$

In an embodiment, in order to identify the reference models calling the sub-control model, the input parameters of the sub-control model includes at least one input parameter for indicating a motor, such as target A, target B, and target M, for selecting different parameters by the sub-control model.

Figure 7:
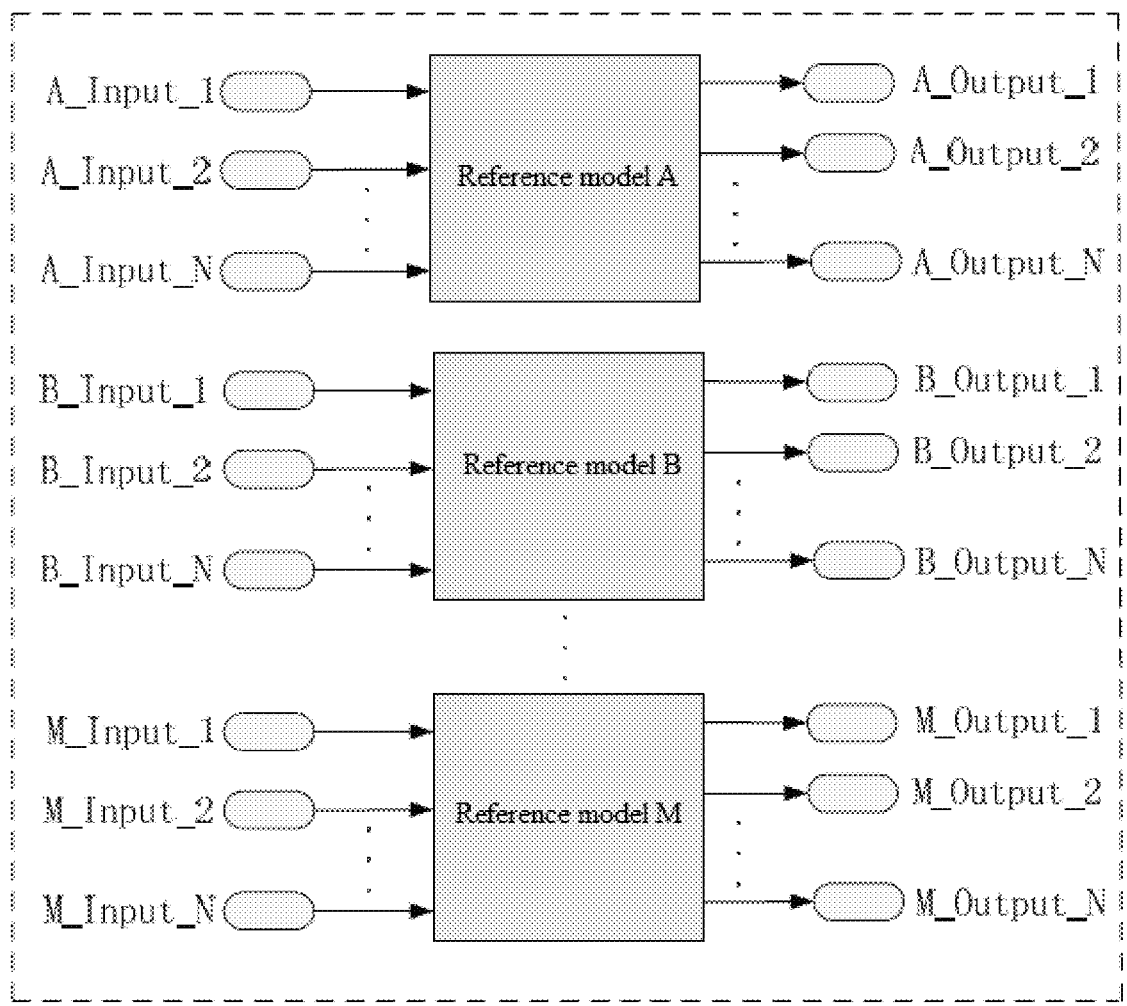
FIG. 7 is a schematic diagram showing inputs and outputs of a master control model in a motor control method according to an embodiment of the present disclosure.

In an embodiment, reference is made to FIG. 7, which is a schematic diagram showing inputs and outputs of a master control model in a motor control method according to an embodiment of the present disclosure. In FIG. 7, Input represents an input parameter, and Input 1 to Input N represent N input parameters; Output represents an output parameter, and Output 1 to Output N represent N output parameters; and A to M represent M reference models. A combination of the above reference signs may represent any input parameter or any output parameter of any reference model. For example, A_Input_1 represents an input parameter 1 of a reference model A, and A_Output_1 represents an output parameter 1 of the reference model A. Based on the above description, it should be understood that each of the reference models calls the sub-control model, and the input parameters of each of the reference models and the input parameters of the sub-control model are configured correspondingly. The sub-control model identifies reference models based on a preset input parameter. Referring to FIG. 5 and FIG. 7, the master control model includes multiple reference models, thus the preset input parameter of the master control model is a set of the input parameters of the multiple reference models, and the preset output parameters of the master control model are the output parameters of the reference models (in an actual process, the preset output parameters of the master control model are the output parameters of the sub-function models).

Referring to FIG. 7, after the master control model shown in FIG. 5 is constructed, the sub-control model may be regarded as a sub-function. For the sub-function, the formal parameters are the input parameters of the sub-control model, the actual parameters are the actually inputted parameters shown in FIG. 7, and the running result is the output parameters shown in FIG. 7.

In the motor control method according to the embodiments of the present disclosure, the same control functions to be performed by different motors are modularly designed. Each of the control functions corresponds to a sub-function model, multiple sub-function models controlled by a sub-control model, and a reference model corresponding to a motor calls the sub-control model to perform a control function. Without configuring a sub-control model and sub-function models for each of the motors, input parameters of a reference model are inputted to a sub-function model controlled by the sub-control model in calling the reference model, thereby performing a control function corresponding to the sub-function model. Therefore, with the method according to the present disclosure, the total code amount of the control program is greatly reduced, reducing the requirement for the performance of the controller, thereby reducing the design cost.

Further, since each of the sub-function models may perform a control function, in upgrading or modifying a control function, it is only required to upgrade or modify a sub-function model corresponding to the control function without performing operations on other sub-function models which are not related to the control function, thereby simplifying the maintenance and management of the control algorithm and reducing the workload of maintenance personnel.

In an embodiment, the motor control system includes at least two motors, and each of the motors corresponds to a to-be-driven entity. Since to-be-driven entities may be different, it is required to configure different logic branches based on the features of the to-be-driven entities. The logic branch is selected with an identification number (such as a serial number or a preset code) respectively preset for each of the motors or each of the to-be-driven entities. After obtaining the target control commands respectively for the motors, logic branches respectively corresponding to the motors are selected, and the target control commands are performed.

In an embodiment, in the motor control method according to the embodiments of the present disclosure, after obtaining the target control commands, a target function model corresponding to part of functions to be performed by the motors is called to filter the target control commands to control the motors to operate based on the filtered target control commands. For example, in a car window control system, a diagnostic function model may be called by each of the motors. However, a Hall Power fault diagnosis function in the diagnostic function model is only performed for a Slave motor.

It should be noted that the target function model may be called to filter the acquired target control commands, and the target function model may be called to filter the total control command which is obtained by comparing the function control commands and the target control commands.

Hereinafter, a motor control apparatus according to an embodiment of the present disclosure is described. The motor control apparatus described below may be regarded as a functional module architecture configured in the controller for implementing the motor control method according to the embodiments of the present disclosure. The following description may be cross-referenced with the above description.

Figure 8:
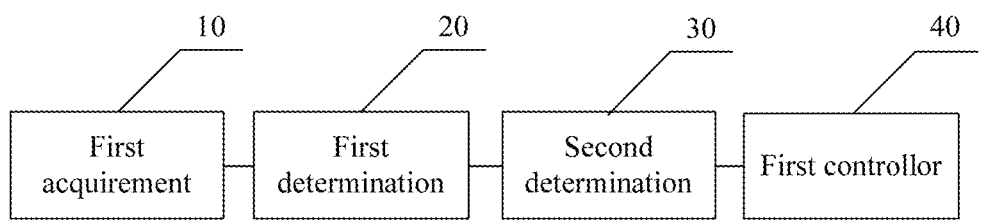
FIG. 8 is a schematic structural diagram of a motor control apparatus according to an embodiment of the present disclosure.

In an embodiment, reference is made to FIG. 8, which is a schematic structural diagram of a motor control apparatus according to an embodiment of the present disclosure. The apparatus may include: a first acquiring 10, a first determination 20, a second determination 30, and a first controller 40. The first acquirement 10 is configured to acquire current control commands, a positional relationship of to-be-driven entities, and a system state at an end of a previous processing period, where the system state at the end of the previous processing period indicates motion states of the motors at the end of the previous processing period. The first determination 20 is configured to determine a target system state corresponding to the system state at the end of the previous processing period based on a preset mapping relationship, the positional relationship of the to-be-driven entities and the current control commands, where the preset mapping relationship indicates transition relationships between system states and transition conditions for the system states. The second determination 30 is configured to determine target control commands based on the target system state. The first controller 40 is configured to control the motors to operate based on the target control commands.

Figure 9:
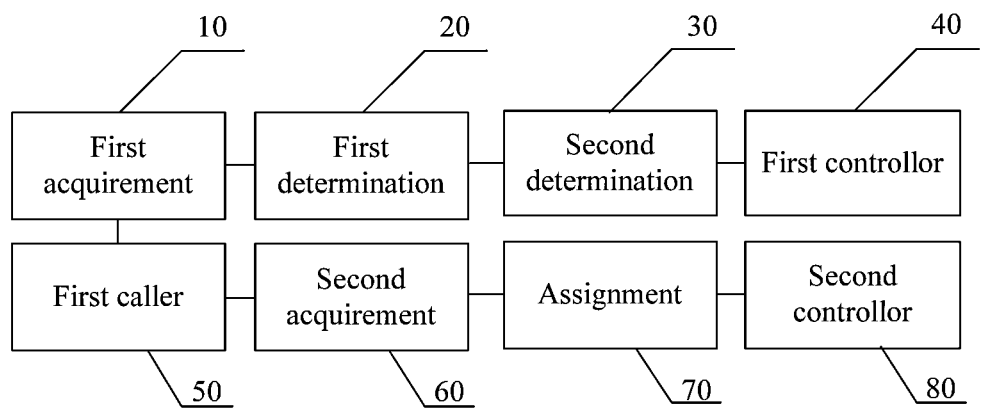
FIG. 9 is a schematic structural diagram of a motor control apparatus according to another embodiment of the present disclosure.

In an embodiment, reference is made to FIG. 9, which is a schematic structural diagram of a motor control apparatus according to another embodiment of the present disclosure. Based on the embodiment shown in FIG. 8, the apparatus further includes: a first caller 50, a second acquirement 60, an assignment 70, and a second controller 80. The first caller 50 is configured to call a preset master control model. The second acquirement 60 is configured to acquire a value to be assigned to a preset input parameter of the master control model. The assignment 70 is configured to assign the value to the preset input parameter to control the master control model to output function control commands respectively corresponding to the motors. The second controller 80 is configured to obtain a total control command based on the function control commands and the target control commands to control each of the motors to operate based on the total control command.

In an embodiment, the master control model includes reference models, the reference models correspond to the motors one-to-one, the preset input parameter is a set including input parameters of all the reference models, all the reference models are associated with a sub-control model, the master control model calls the sub-control model to output the function control commands based on the preset input parameter with the assigned value, and the sub-control model includes sub-function models required for obtaining the function control commands.

In an embodiment, the sub-control model is arranged with multiple association interfaces for calling the sub-function models, and the association interfaces correspond to the sub-function models one-to-one.

Figure 10:
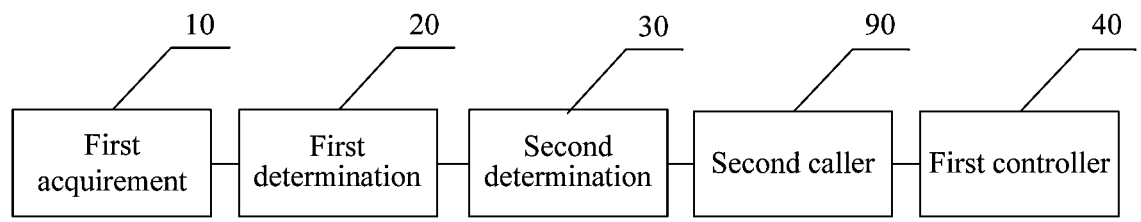
FIG. 10 is a schematic structural diagram of a motor control apparatus according to another embodiment of the present disclosure.

In an embodiment, reference is made to FIG. 10, which is a schematic structural diagram of a motor control apparatus according to another embodiment of the present disclosure. Based on the embodiment shown in FIG. 8, the apparatus further includes: a second caller 90. The second caller 90 is configured to call a target function model to filter the target control commands to control the motors to operate based on the filtered target control commands, where the target function model is configured to perform part of functions to be performed by the motors.

In an embodiment, a motor control device is provided according to the present disclosure. The device includes: a memory and a processor. The memory stores a program executable for the processor. The program, when executed by the processor, causes the processor to perform the motor control method according to any one of the embodiments of the present disclosure.

In an embodiment, a storage medium storing a program is provided according to the present disclosure. The program, when executed by a processor, causes the processor to perform the motor control method according to any one of the embodiments of the present disclosure.

In an embodiment, a computer program product is provided according to the present disclosure. The computer program product includes a computer program stored on a non-transitory computer-readable storage medium. The computer program includes program instructs. The program instructs, when executed by a computer, cause the computer to perform the motor control method according to any one of the embodiments of the present disclosure.

The embodiments in this specification are described in a progressive way, each of which emphasizes the differences from others, and the same or similar parts among the embodiments can be referred to each other. Since the apparatus disclosed in the embodiments corresponds to the method therein, the description thereof is relatively simple, and for relevant matters references may be made to the description of the method.

It may be known by those skilled in the art that, units and steps in each example described in conjunction with the embodiments disclosed herein can be realized by electronic hardware, computer software or a combination thereof. In order to clearly illustrate interchangeability of the hardware and the software, steps and composition of each embodiment have been described generally in view of functions in the above specification. Whether the function is executed in a hardware way or in a software way depends on application of the technical solution and design constraint condition. Those skilled in the art can use different method for each application to realize the described function, and this is not considered to be beyond the scope of the application.

The steps of the methods or algorithms described in conjunction with the embodiments of the present disclosure can be implemented with hardware, software modules executed by a processor, or a combination thereof. The software modules may reside in a random access memory (RAM), an internal memory, a read only memory (ROM), an electric programmable ROM, an electric-erasable programmable ROM, a register, a hard disk, a removable disk drive, CD-ROM, or other types of storage media well known in the technical field.

According to the above description of the disclosed embodiments, those skilled in the art can implement or practice the present disclosure. Various modifications to the embodiments are apparent for the skilled in the art. General principles defined herein may be implemented in other embodiments without departing from the scope of the present disclosure. Hence, the present disclosure is not limited to the embodiments disclosed herein, but is to conform to the widest scope in accordance with the principles and novel features disclosed herein.

The invention claimed is:

1. A motor control method, applied to a controller in a motor control system, wherein the motor control system comprises one controller and at least two motors, each of the motors drives a to-be-driven entity, and the method comprises:

acquiring current control commands, a positional relationship of to-be-driven entities, and a system state at an end of a previous processing period, wherein the system state at the end of the previous processing period indicates motion states of the motors at the end of the previous processing period indicating whether each of the motors is in operation and whether the motor is rotating forward or backward;

determining a target system state corresponding to the system state at the end of the previous processing period based on a preset mapping relationship, the positional relationship of the to-be-driven entities and the current control commands, wherein the preset mapping relationship indicates transition relationships between system states and transition conditions for the system states;

determining target control commands based on the target system state; and controlling the motors to operate based on the target control commands, wherein when the controller is directly arranged together with any one of the multiple motors, the motor directly connected to the controller and the controller operate as a Master, the motor directly connected to the controller operates as a Master motor, and each of the other motors are connected to the controller via a wire harness and operate as a Slave motor; and wherein when the controller is arranged independently and is not directly connected to any motor, the controller operates as the Master, and each of the motors are connected to the controller via a wire harness and operate as a Slave motor.

2. The motor control method according to claim 1, further comprising:

calling a preset master control model;

acquiring a value to be assigned to a preset input parameter of the master control model;

assigning the value to the preset input parameter to control the master control model to output function control commands respectively corresponding to the motors; and obtaining a total control command based on the function control commands and the target control commands to control each of the motors to operate based on the total control command.

3. The motor control method according to claim 2, wherein the master control model comprises reference models, the reference models correspond to the motors one-to-one, the preset input parameter is a set comprising input parameters of all the reference models, all the reference models are associated with a sub-control model, the master control model calls the sub-control model to output the function control commands based on the preset input parameter with the assigned value, and the sub-control model comprises sub-function models required for obtaining the function control commands.

4. The motor control method according to claim 3, wherein the sub-control model is arranged with a plurality of association interfaces for calling the sub-function models, and the association interfaces correspond to the sub-function models one-to-one.

5. The motor control method according to claim 1, wherein before controlling the motors to operate based on the target control commands, the method further comprises:

calling a target function model to filter the target control commands to control the motors to operate based on the filtered target control commands, wherein the target function model performs part of functions to be performed by the motors.

6. A motor control apparatus, applied to a controller in a motor control system, wherein the motor control system comprises one controller and at least two motors, each of the motors drives a to-be-driven entity, and the apparatus comprises:

a first acquirement, configured to acquire current control commands, a positional relationship of to-be-driven entities, and a system state at an end of a previous processing period, wherein the system state at the end of the previous processing period indicates motion states of the motors at the end of the previous processing period indicating whether each of the motors is in operation and whether the motor is rotating forward or backward;

a first determination, configured to determine a target system state corresponding to the system state at the end of the previous processing period based on a preset mapping relationship, the positional relationship of the to-be-driven entities and the current control commands, wherein the preset mapping relationship indicates transition relationships between system states and transition conditions for the system states;

a second determination, configured to determine target control commands based on the target system state; and a first controller, configured to control the motors to operate based on the target control commands, wherein when the controller is directly arranged together with any one of the multiple motors, the motor directly connected to the controller and the controller operate as a Master, the motor directly connected to the controller operates as a Master motor, and each of the other motors are connected to the controller via a wire harness and operate as a Slave motor; and wherein when the controller is arranged independently and is not directly connected to any motor, the controller operates as the Master, and each of the motors are connected to the controller via a wire harness and operate as a Slave motor.

7. The motor control apparatus according to claim 6, further comprising:

a first caller, configured to call a preset master control model;

a second acquirement, configured to acquire a value to be assigned to a preset input parameter of the master control model;

an assignment, configured to assign the value to the preset input parameter to control the master control model to output function control commands respectively corresponding to the motors; and a second controller, configured to obtain a total control command based on the function control commands and the target control commands to control each of the motors to operate based on the total control command.

8. The motor control apparatus according to claim 7, wherein the master control model comprises reference models, the reference models correspond to the motors one-to-one, the preset input parameter is a set comprising input parameters of all the reference models, all the reference models are associated with a sub-control model, the master control model calls the sub-control model to output the function control commands based on the preset input parameter with the assigned value, and the sub-control model comprises sub-function models required for obtaining the function control commands.

9. The motor control apparatus according to claim 8, wherein the sub-control model is arranged with a plurality of association interfaces for calling the sub-function models, and the association interfaces correspond to the sub-function models one-to-one.

10. The motor control apparatus according to claim 6, further comprising:

a second caller, configured to call a target function model to filter the target control commands to control the motors to operate based on the filtered target control commands, wherein the target function model is configured to perform part of functions to be performed by the motors.

\* \* \* \* \*